May 4, 1954 M. AUWÄRTER 2,677,714
OPTICAL-ELECTRICAL CONVERSION DEVICE COMPRISING
A LIGHT-PERMEABLE METAL ELECTRODE
Filed Sept. 21, 1951
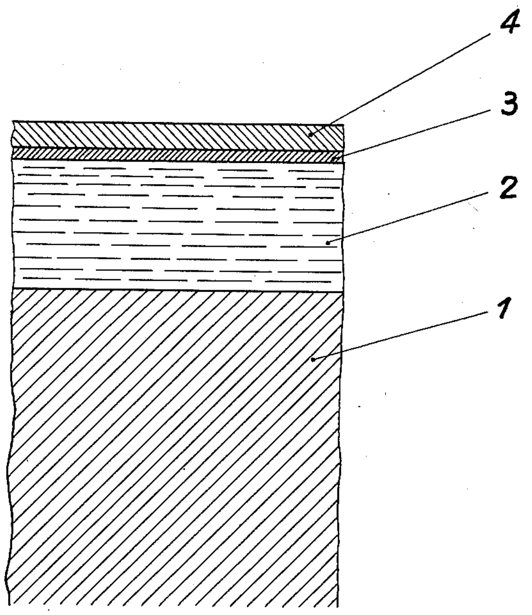
The Jnventor:
Max Auwärter Patented May 4, 1954

2,677,714

UNITED STATES PATENT OFFICE 2,677,714

OPTICAL-ELECTRICAL CONVERSION DEVICE COMPRISING A LIGHT-PERMEABLE METAL ELECTRODE

Max Auwärter, Balzers, Liechtenstein, assignor to Dr. Alois Vogt, Vaduz, Liechtenstein Application September 21, 1951, Serial No. 247,703

14 Claims. (Cl. 136—89)

Optical-electrical conversion devices such as blocking layer photoelectric elements and other electric instruments responsive to light comprise thin light-permeable metal electrodes, which must have the highest possible electrical conductivity and light permeability to ensure a high efficiency of the conversion device.

In, for example, photoelectric elements, particularly thin gold layers are used as metal electrodes because they are highly conductive and extremely resistant to chemical influences. Such thin gold layers have a permeability of approximately 50% of the incident light, the absorption by the gold layer itself approximating only 15% whereas the other 35% are lost by reflection. Reflection losses are suffered mainly at that surface of the gold layer which faces the incident light.

The resulting problem of substantially increasing the efficiency of such optical-electrical conversion device comprising a light permeable metal electrode is solved in accordance with the invention by a construction of such device whereby the reflection at the surface of the electrode facing the incident light is reduced. It has already been attempted to achieve such a reduction of reflection by the use of layers of lacquer whose thickness was one-fourth of the wave length of the radiation which was to be converted into electrical energy, as a layer of lacquer on a metallic reflecting base reduces the degree of reflection, inasmuch as the reflection of a lacquer layer is always less than the reflection of a metallic surface. However, the reduction of reflection obtained by the use of lacquer layers is entirely insufficient to increase substantially the effectiveness of optical-electrical conversion devices. The reason for this is that the refraction indices of the available lacquers are too low for this purpose.

It is accordingly an object of the present invention to reduce very considerably, and in a simple manner, the reflection of optical-electrical conversion devices over the maximum reduction that is attainable with lacquer films. It is a further object of the invention to dispense with the necessity of constructing the metallic electrodes in devices of the above indicated character from noble metals and to make it possible to employ other electrically conducting but less expensive metals like copper and copper alloys.

It is a still further object of the invention to provide a structure of the type indicated in which the thickness of the metal electrode can be considerably increased in comparison with the thickness heretofore employed and its resistance thereby reduced.

In accordance with the present invention, there can be employed materials for reducing reflection which are mechanically and chemically resistant, for only such materials have the property of so protecting the metallic electrode that it fully maintains its efficiency. In particular, the electrode must be protected against mechanical injury and against the entry of the atmosphere against which, for example, copper and copper alloys are not resistant. If, however, the reflection-reducing films have the capacity for protecting the copper or copper alloys against the entry of the atmosphere, such metals can find application as electrodes in optical-electrical converters despite their lower corrosion resistance, because they possess to an adequate degree the important property of high electrical conductivity.

The thickness of the metal electrodes could not heretofore be increased beyond a definite value because thereby the transparency or permeability of the electrodes to incident radiation was reduced. Should it, however, be possible by a marked reduction of the reflection to increase greatly the incident radiation in the optical-electrical converter, then the disadvantage that was to be expected by reason of the reduced light-permeability is eliminated because, despite the thicker metal electrodes, the incident radiation remains sufficiently intense to produce adequately high photoelectric currents. By such measure there is reached the region of a linear relationship between the photoelectric current and the intensity of the incident radiation. This is of extremely high practical importance, for the need for a linear optical-electrical converter in physics, and particularly in the optical measuring art, is very great. There was heretofore no possibility of producing such a converter in such manner that the linear relationship between the photoelectric current and the incident light occurred in every case. It was, in fact, necessary to select from the produced photoelectric elements those which accidentally were so constructed that the film thickness lay exactly on the boundary between a just adequate radiation permeability on the one hand and a certain linearity between the radiation intensity and the produced photoelectric current on the other. These, however, amounted to only a rather small percentage of the elements produced in a production series. Consequently, these converters with linear relationship were extremely expensive because they had to bear the cost of the whole series. As, therefore, in accordance with the invention, it has because possible by a considerable reduction of the reflection to increase the incident radiation to such an extent that with a sufficiently high efficiency of the optical-electrical converter the thickness of the metallic electrode can be considerably increased, converters of this type can be manufactured systematically which have a completely linear, that is a proportional, relationship between the radiation intensity and the photoelectric current. With these the electrical resistance of the metallic electrode is so small, in consequence of its increased thickness, that this relationship occurs, whereby a device useful for all measuring-technical processes arises practically without production rejects, so that it can always be produced in the same quality and becomes independent of all accidents with regard to the electrode thickness. If, however, this linear relationship is relinquished, then the efficiency of the optical-electrical converter can be increased to a greater degree, so that fields of use are opened up which heretofore could not be satisfactorily supplied with the known devices.

The objects of the invention are, accordingly, attained by an optical-electrical converter with light-permeable metallic electrode which, in accordance with the invention, is characterized by the feature that on the surface of the electrode facing the incident light at least one dielectric film or layer is arranged whose thickness and index of refraction are such that reflected amplitudes of incident light at the border surface between the air and the cover layer on the one hand, and between the cover layer and the electrode on the other, extinguish each other either totally or in large part through interference for a frequency lying at the middle of the transmitted range. If the layer composed of a dielectric or of several dielectrics has a thickness which is equal to ¼ of the wave length of the incident light of the frequency in the middle of the range transmitted, the said amplitudes are phase-displaced by half a wavelength so as mutually to annihilate each other when they are of equal magnitude, the reflection thus becoming zero. The same effect is achieved when the thickness of the layer corresponds to an odd multiple of the said value. Owing to the properties of such dielectrics consisting of mechanically and chemically resistant substances it is possible to provide metal electrodes not only of gold and silver but also of substances such as copper and copper alloys which are highly conductive electrically but less resistant to atmospheric influences. The dielectric layer need not constitute a cover layer. Protective layers may be arranged on the cover layer provided that their construction is such as not to alter the reflection reducing or removing properties of the dielectric layer.

Optical-electrical conversion devices constructed in accordance with the invention are characterized in that at least one layer consisting of at least one dielectric is produced on that limiting surface of the light-permeable metal electrode which faces the incident light, the refractive index of said layer being chosen and its thickness being adjusted so that for a frequency in the middle of the range transmitted amplitudes of incident light reflected at the boundary surfaces between air and dielectric and between dielectric and metal electrode completely or preponderantly offset each other. This is achieved by diminishing the thickness of the dielectric to amount to one fourth or to an odd multiple of one fourth of the wavelength of incident light of a frequency in the middle of the range transmitted. Another characteristic feature of the invention consists in that a chemically and mechanically resistant dielectric is applied on the metal electrode. This can be achieved thereby that metal oxides such as silica ($SiO_2$) or silicon monoxide ($SiO$), metal fluorides such as magnesium fluoride ($MgF$), metal sulphides such as zinc sulphide ($ZnS$) or other suitable metal compounds are applied. Particularly suitable methods of application comprise evaporation in a vacuum and precipitation on the metal electrode, other methods of application not being excluded. The thin light-permeable metal electrode may also be produced by evaporation and deposition in a vacuum, by cathode sputtering, chemical decomposition or thermal treatment.

Practical experiments have shown that the application of a dielectric layer practically free from absorption on that limiting surface of a partially permeable metal layer which faces the incident light leads to a reduction of reflection approximately to zero. In virtue of the energy laws this reduction of reflection increases the permeability of the total structure to a value delimited only by the absorption of the metal layer. This leads to a considerable improvement of the light recovery and it is obvious that thereby the efficiency of an optical-electrical conversion device provided with such electrode is critically increased. Owing to the improved light recovery achieved the metal electrode can be made much thicker than before without thus increasing the absorption, whereas its electric resistance is reduced. In particular the transverse resistance effective across the conductor layer becomes insignificant as compared with the longitudinal resistance of the layer. By these measures the sensitivity of photoelectric instruments in which the electrical conductivity depends on the light permeability can be considerably increased. By the same measures it is possible, in the case of all optical-electrical converters constructed in accordance with the invention, to provide for the existence of a linear relationship between the intensity of the incident radiation and the produced electric current, so that the disadvantage of prior converters of this type is eliminated, which consisted in the fact that such linear relationship occurred only when it was possible accidentally to realize a suitable thickness of the metallic electrode.

It is also possible to superimpose several dielectric layers to achieve certain other optical effects.

The drawing is a greatly enlarged and diagrammatic, out-of-scale sectional view of the photoelectric element of an optical-electrical conversion device, which photoelectric element is constructed in accordance with the invention.

In the drawing 1 is a metal backing of any suitable kind. 2 designates the photo-sensitive semi-conductor, 3 designates the light-permeable metal cover layer, which may consist, e. g., of gold, silver, or copper, other metal cover layers not being excluded. These metal layers may be produced by any suitable method, such as by evaporation and deposition in a high vacuum. Other suitable methods consist in depositing the metal layers in the form of dust, such as by cathode sputtering. Otherwise the metal layers may be produced by chemical decomposition or thermal processes. 4 designates the layer of a dielectric which in accordance with the invention is so formed that light vectors produced at the boundary surfaces between 4 and the air and between 4 and 3 mutually annihilate more or less completely or entirely by the interference resulting from their superposition. For this reason the refractive indexes of this dielectric are to be adjusted so that for a light frequency in the middle of the range transmitted the annihilation of the light amplitudes and thus the more or less complete annihilation of the reflection of the incident light is achieved. Examples of suitable dielectrics are metal oxides such as silica ($SiO_2$) and silicon monoxide (SiO). Other suitable substances are metal fluorides such as magnesium fluoride (MgF), sulphides such as zinc sulphide (ZnS), metal phosphides, and other suitable metal compounds. To achieve the more or less complete annihilation of the light amplitudes the thickness of such dielectric layers 4 is adjusted to one fourth or to an odd multiple of one fourth of the wavelength of the incident light of the frequency in the middle of the range transmitted. Instead of a layer of this thickness formed by one dielectric, other layers of the same thickness may be formed from different dielectrics. It is also possible to arrange mixtures of dielectrics in the thickness required in accordance with the above.

What I claim is:

1. An optical-electrical conversion device comprising, in combination, a photo-sensitive semiconductor, at least one thin light-permeable metal layer arranged on that limiting surface of the photo-sensitive semiconductor which faces the incident light, and at least one reflection reducing cover layer arranged on that limiting surface of a light-permeable metal layer which faces the incident light, the thickness and refractive index of said cover layer being so related to the refractive index at the metal-cover layer boundary that for a frequency substantially in the middle of the transmitted spectral range, the amplitudes of incident light reflected from the cover layer and between the metal and cover layers substantially completely extinguish each other.

2. An optical-electrical conversion device comprising, in combination, a photo-sensitive semiconductor, at least one thin light-permeable metal layer arranged on that limiting surface of the photo-sensitive semiconductor which faces the incident light, and at least one thin layer consisting of a dielectric arranged on that limiting surface of a light-pearmeable metal layer which faces the incident light, the thickness of said layer being equal to one fourth or to an odd multiple of one fourth of the wavelength of incident light of a frequency in the middle of the range transmitted, the refractive index of said dielectric layer being so related to the refractive index at the metal-dielectric boundary that for a frequency substantially in the middle of the transmitted spectral range, the amplitudes of incident light reflected from the dielectric layer and between the metal-dielectric layer substantially completely extinguish each other.

3. An optical-electrical conversion device comprising, in combination, a photo-sensitive semiconductor at least one thin light-permeable metal layer of high electrical conductivity arranged on that limiting surface of the photo-sensitive semiconductor which faces the incident light, and at least one cover layer almost removing the reflection of said metal layer and arranged on that limiting surface of a light-permeable metal layer which faces the incident light, the thickness and refractive index of said cover layer being so related to the refractive index at the metal-cover layer boundary that for a frequency substantially in the middle of the transmitted spectral range, the amplitudes of incident light reflected from the cover layer and between the metal and cover layers substantially completely extinguish each other.

4. A device as defined in claim 1 wherein the thickness of the cover layer is $$\frac{a\lambda}{4}$$

$a$ being an odd integer, and $\lambda$ being the wavelength at the said frequency.

5. A device as defined in claim 4, wherein $a=1$.

6. A device as defined in claim 3, wherein the metal layer is composed of a member of the group consisting of copper and copper alloys.

7. A device as defined in claim 3, wherein the metal layer is of gold.

8. A device as defined in claim 3, wherein the metal layer is of silver.

9. A device as defined in claim 3, wherein the metal layer is of copper.

10. A device as defined in claim 1, wherein the cover layer is composed of a member of the group consisting of silicon and metal oxides, metal sulphides, metal fluorides and metal phosphides.

11. A device as defined in claim 1, wherein the cover layer is a silicon oxide.

12. A device as defined in claim 1, wherein the cover layer is zinc sulfide.

13. A device as defined in claim 1, wherein the cover layer is magnesium fluoride.

14. A device as defined in claim 1, wherein the metal layer is composed of a member of the group consisting of gold, silver, copper and copper alloys and wherein the cover layer is composed of a member of the group consisting of silicon and metal oxides, metal sulphides, metal fluorides and metal phosphides.

References Cited in the file of this patent

UNITED STATES PATENTS

| Number | Name | Date |
|---|---|---|
| 2,104,483 | Hewitt | Jan. 4, 1938 |
| 2,114,591 | Clark | Apr. 19, 1938 |
| 2,402,662 | Ohl | June 25, 1946 |
| 2,423,124 | Teal | July 1, 1947 |
| 2,423,125 | Teal | July 1, 1947 |
| 2,433,402 | Saslaw | Dec. 30, 1947 |